(12) United States Patent
Fujimura et al.

(10) Patent No.: US 11,593,817 B2
(45) Date of Patent: Feb. 28, 2023

(54) DEMAND PREDICTION METHOD, DEMAND PREDICTION APPARATUS, AND NON-TRANSITORY COMPUTER-READABLE RECORDING MEDIUM

(71) Applicant: Panasonic Intellectual Property Corporation of America, Torrance, CA (US)

(72) Inventors: Ryota Fujimura, Kanagawa (JP); Iku Ohama, Osaka (JP); Hideo Umetani, Osaka (JP); Yukie Shoda, Osaka (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 1161 days.

(21) Appl. No.: 15/184,985

(22) Filed: Jun. 16, 2016

(65) Prior Publication Data
US 2017/0004404 A1    Jan. 5, 2017

(30) Foreign Application Priority Data

Jun. 30, 2015   (JP) .............................. JP2015-130986
Mar. 16, 2016   (JP) .............................. JP2016-051976

(51) Int. Cl.
*G06Q 30/02*   (2012.01)
*G06N 20/00*   (2019.01)

(52) U.S. Cl.
CPC ............. *G06Q 30/02* (2013.01); *G06N 20/00* (2019.01)

(58) Field of Classification Search
None
See application file for complete search history.

(56) References Cited

U.S. PATENT DOCUMENTS 8,014,983 B2 *  9/2011  Crowe .................. G06Q 10/10
                                            702/181
2008/0222109 A1 * 9/2008  Sakurai ............ G06F 17/30551
(Continued)

FOREIGN PATENT DOCUMENTS

JP    7-191967 A    7/1995
JP    9-101947      4/1997
JP    2015-076076 A 4/2015

OTHER PUBLICATIONS

Ng, S., "Variable Selection in Predictive Regressions," Handbook of Economic Forecasting, vol. 2B (2012) 40 pp. (Year: 2012).*

(Continued)

*Primary Examiner* — Brian M Smith
(74) *Attorney, Agent, or Firm* — Greenblum & Bernstein, P.L.C.

(57) ABSTRACT

A demand prediction method using a computer includes calculating an error between a prediction value of an amount of a past demand and a measurement value of the amount of the past demand, the prediction value of the amount of the past demand being calculated by inputting a measurement value of a past explanatory variable to a prediction model that is constructed in accordance with a measurement value of an amount of a demand at a predetermined location and an explanatory variable that serves as an external factor that affects an increase or a decrease in the amount of the demand at the predetermined location, determining whether the calculated error is an abnormal value, acquiring a new explanatory variable if the error is determined to be the abnormal value, updating the prediction model in accordance with the acquired new explanatory variable, and newly predicting an amount of a future demand using the updated prediction model.

16 Claims, 16 Drawing Sheets

(56) References Cited

U.S. PATENT DOCUMENTS

| | | | |
|---|---|---|---|
| 2008/0262820 A1* | 10/2008 | Nasle | G06Q 30/0206 |
| | | | 703/18 |
| 2012/0191631 A1* | 7/2012 | Breckenridge | G06N 20/00 |
| | | | 706/12 |
| 2014/0180973 A1* | 6/2014 | Lingenfelder | G06N 99/005 |
| | | | 706/12 |
| 2014/0351008 A1* | 11/2014 | Oyamatsu | G06Q 30/0202 |
| | | | 705/7.29 |
| 2015/0302318 A1* | 10/2015 | Chen | G06N 99/005 |
| | | | 706/12 |
| 2015/0379424 A1* | 12/2015 | Dirac | G06N 20/00 |
| | | | 706/12 |
| 2017/0039470 A1* | 2/2017 | Hirayama | G06Q 10/0639 |
| 2018/0181875 A1* | 6/2018 | Motohashi | G06Q 10/04 |

OTHER PUBLICATIONS

Rutz, O. et al., "Modeling Indirect Effects of Paid Search Advertising: Which Keywords Lead to More Future Visits?" Marketing Science, vol. 30, No. 4 (Jul.-Aug. 2011) pp. 646-665. (Year: 2011).*

Xu, J. et al., "Forecasting popularity of videos using social media," IEEE Journal of Selected Topics in Signal Processing, vol. 9, No. 2 (Mar. 2015) pp. 330-343. (Year: 2015).*

Srivastava, D.K., "Tax revenue forecasting in a developing economy with special reference to India," dissertation for University of St. Andrews (1974) 159 pp. (Year: 1974).*

Miguel Rocha et al., "Evolution of Neural Networks for Classification and Regression", NeuroComputing, vol. 70, Issue 16-18, 2007, pp. 2809-2816.

* cited by examiner

FIG. 4

| DATE | NUMBER OF VISITING CUSTOMERS | DAY OF WEEK | WEATHER | TEMPERATURE | ... |
|---|---|---|---|---|---|
| 2014/10/01 | 203 | WEDNESDAY | FINE | 15.2 | ... |
| 2014/10/02 | 243 | THURSDAY | CLOUDY | 13.7 | ... |
| 2014/10/03 | 306 | FRIDAY | RAINY | 14.9 | ... |
| 2014/10/04 | 539 | SATURDAY | FINE | 12.1 | ... |
| 2014/10/05 | 527 | SUNDAY | FINE | 16.5 | ... |
| ⋮ | ⋮ | ⋮ | ⋮ | ⋮ | ⋮ |

FIG. 8

| DATE | MEASUREMENT VALUE | PREDICTION VALUE | MODEL ERROR | |
|---|---|---|---|---|
| 2014/10/15 | 120 | 450 | −330 | INPUT |
| 2014/10/16 | 160 | 480 | −320 | INPUT |
| 2014/10/22 | 650 | 440 | +210 | INPUT |

FIG. 17

| EXPLANATORY NAME | CORRECTION VALUE RESPONSIVE TO FALSE VARIABLE VALUE | CORRECTION VALUE RESPONSIVE TO TRUE VARIABLE VALUE |
|---|---|---|
| LOCAL ATHLETIC MEETING | 0 | +120 |
| FIREWORKS DISPLAY IN THE SUBURBS | 0 | −100 |
| ⋮ | ⋮ | ⋮ |

DEMAND PREDICTION METHOD, DEMAND PREDICTION APPARATUS, AND NON-TRANSITORY COMPUTER-READABLE RECORDING MEDIUM

BACKGROUND

1. Technical Field

The present disclosure relates to a demand prediction method, a demand prediction apparatus, and a non-transitory computer-readable recording medium storing a demand prediction program.

2. Description of the Related Art

Techniques for numerically modeling a relationship between an amount of a demand and an external factor (explanatory variable) that affects an increase or a decrease in the amount of the demand are disclosed to predict an amount of a future demand. Such techniques include the multiple regression model and the neural network. Reference is made to Miguel Rocha, Paulo Cortez, and Jose Neves, "Evolution of Neural Networks for Classification and Regression", NeuroComputing, Vol. 70, Issue 16-18, 2007 (pp. 2809-2816).

A variety of types of explanatory variables are available, and the type of an explanatory variable used in a model is determined according to the experience and knowledge of a user. Each user has not necessarily learned every relationship as to which and how explanatory variable affects the amount of the demand. There is a possibility that the model lacks an explanatory variable needs to be used. The accuracy level of the prediction thus largely depends on the experience and knowledge of a user about a prediction target.

Japanese Unexamined Patent Application Publication No. 9-101947 discloses a time-sequence prediction method that is based on a computer that computes an amount of sales of a product during a prediction period of time. If an abnormal value is caused, an interactive system is set up between a planner and generating factors of an abnormal value, based on factor candidate information concerning a variety of factors occurring at the same time the abnormal value is caused. The prediction accuracy of the sales amount is thus increased.

SUMMARY

In one general aspect, the techniques disclosed here feature a demand prediction method using a computer. The demand prediction method includes calculating an error between a prediction value of an amount of a past demand and a measurement value of the amount of the past demand, the prediction value of the amount of the past demand being calculated by inputting a measurement value of a past explanatory variable to a prediction model that is constructed in accordance with a measurement value of an amount of a demand at a predetermined location and an explanatory variable that serves as an external factor that affects an increase or a decrease in the amount of the demand at the predetermined location, determining whether the calculated error is an abnormal value, acquiring a new explanatory variable if the error is determined to be the abnormal value, updating the prediction model in accordance with the acquired new explanatory variable, and newly predicting an amount of a future demand using the updated prediction model. At least one of the calculating, the determining, the acquiring, the updating and the newly predicting is performed by a processor included in the demand prediction apparatus.

In accordance with the disclosure, the number of input operations by a user is reduced, time to acquire an explanatory variable is reduced, and the prediction accuracy of the amount of the demand is increased.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 4 illustrates an example of information stored on an information storage unit of the embodiment of the disclosure;

FIG. 8 illustrates an example of a display screen displaying a model error that is an abnormal value;

FIG. 17 illustrates an example of an explanatory variable stored on the information storage unit of the embodiment of the disclosure.

DETAILED DESCRIPTION

Figure 1:
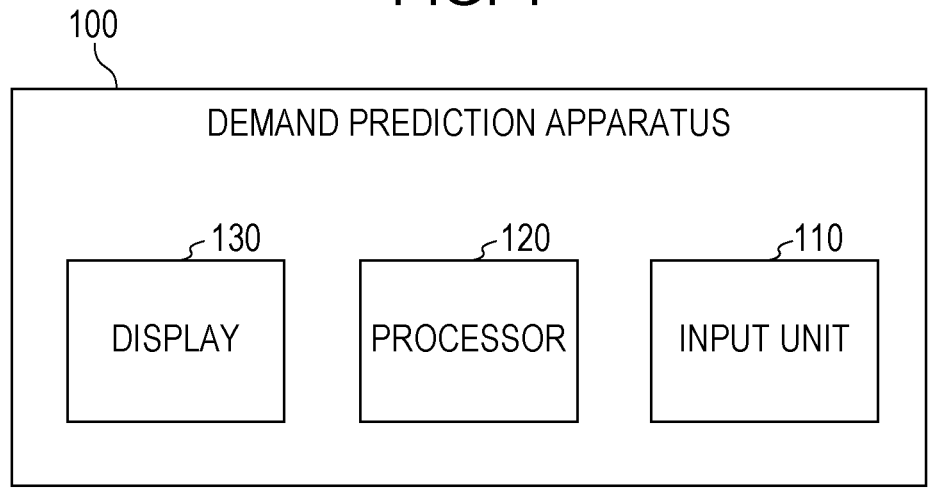
FIG. 1 is a block diagram generally illustrating a demand prediction apparatus of an embodiment of the disclosure.

Underlying Knowledge Forming Basis of the Present Disclosure

As the performance of computers and information storage technology advance, a technique of predicting an amount of a future demand is implemented using a record of time-sequentially stored actual demand amount. Amounts of demand to be predicted may include the number of visitors coming to the food service industry, sales quantity in the retailing industry, and power consumption in the electric utility.

Techniques to predict an amount of a future demand are disclosed. One of the techniques includes numerically modeling a relationship between an amount of a demand and an external factor (explanatory variable) that affects an increase or a decrease in the amount of the demand (such as the multiple regress model and the neural network). In the technique of modeling the relationship between the amount of demand and the explanatory variable, a user needs to list up which information to use as the explanatory variable in advance. The knowledge of the user concerning the prediction target greatly affects the accuracy of prediction.

A related art technique disclosed in Japanese Unexamined Patent Application Publication No. 9-101947 is intended to solve the problem.

The technique disclosed in Japanese Unexamined Patent Application Publication No. 9-101947 segments an amount of a past demand by the time-sequence duration, and determines from the segmented component whether an abnormal value is generated. The technique is unable to determine whether a factor causing the abnormal value is accounted for in a prediction model as an explanatory variable. For this reason, if the abnormal value is generated by the explanatory variable accounted for in the prediction model, the user may again be prompted to enter the explanatory variable. The number of input operations by the user is not reduced. More specifically, a new explanatory variable needs to be acquired after removing a variation in the amount of demand in response to the explanatory variable accounted for in the prediction mode.

According to an aspect of the disclosure, there is provided a demand prediction method using a computer. A demand prediction method includes calculating an error between a prediction value of an amount of a past demand and a measurement value of the amount of the past demand, the prediction value of the amount of the past demand being calculated by inputting a measurement value of a past explanatory variable to a prediction model that is constructed in accordance with a measurement value of an amount of a demand at a predetermined location and an explanatory variable that serves as an external factor that affects an increase or a decrease in the amount of the demand at the predetermined location, determining whether the calculated error is an abnormal value, acquiring a new explanatory variable if the error is determined to be the abnormal value, updating the prediction model in accordance with the acquired new explanatory variable, and newly predicts an amount of a future demand using the updated prediction model. At least one of the calculating, the determining, the acquiring, the updating and the newly predicting is performed by a processor in the demand prediction apparatus.

In this way, the processor calculates the error between the prediction value of the amount of the past demand and the measurement value of the amount of the past demand. The prediction value of the amount of the past demand is calculated by inputting the measurement value of the past explanatory variable to the prediction model that is constructed in accordance with the measurement value of the amount of the demand at the predetermined location and the explanatory variable that serves as the external factor that affects the increase or the decrease in the amount of the demand at the predetermined location. The processor determines whether the calculated error is the abnormal value. The processor acquires the new explanatory variable if the error is determined to be the abnormal value. The processor updates the prediction model in accordance with the acquired new explanatory variable. The processor newly predicts an amount of a future demand using the updated prediction model.

The error between the measurement value of the amount of the past demand and the prediction value resulting from the prediction model is calculated, and the new explanatory variable is acquired based on the calculated error. An efficient explanatory variable is thus acquired in a manner free from the variation in the demand amount caused by the explanatory variable accounted for in the prediction mode in advance. In this way, the number of input operations by the user is reduced, time to acquire the explanatory variable is decreased, and the prediction accuracy of the demand amount is increased.

The demand prediction method may further include time-sequentially displaying the error that is determined to be the abnormal value.

Since the error that is determined to be the abnormal value is time-sequentially displayed, the user may confirm the error determined to be the abnormal value.

In the demand prediction method, the new explanatory variable may be acquired by receiving an input from a user.

Since the new explanatory variable is acquired by receiving the user input in this arrangement, the explanatory variable may reflect the user's experience and knowledge.

The demand prediction method may further include acquiring candidate information indicating at least one explanatory variable candidate if the error is determined to be the abnormal value, and selectively displaying the acquired candidate information.

If the error is determined to be the abnormal value in this arrangement, the candidate information indicating at least one explanatory variable candidate is acquired. The acquired candidate information is selectively displayed.

Since the candidate information indicating at least one explanatory variable candidate is displayed in a manner that allows an explanatory candidate to be selected, the user may easily select a new explanatory variable.

In the demand prediction method, the candidate information may include local area information concerning a local area surrounding the predetermined location in a time period when a measurement operation is performed to obtain the measurement value of the past demand that is used to calculate the error that is determined to be the abnormal value.

This arrangement allows to be obtained as the candidate information the local area information concerning the local area surrounding the predetermined location in the time period when the measurement operation is performed to obtain the measurement value of the past demand used to calculate the error determined to be the abnormal value. The local area information concerning the local area surrounding the predetermined location in the time period when the measurement operation is performed to obtain the measurement value of the past demand used to calculate the error determined to be the abnormal value is presented to the user as a new explanatory variable.

In demand prediction method, keywords as the candidate information may be acquired from an external server that provides the search engine or the social networking service in the acquiring of the candidate information if the error is determined to be the abnormal value. The keywords as the candidate information may be a plurality of keywords that are extracted in an order of a decreasing search count with a search engine from a larger search count to a smaller search count, or a plurality of keywords that are extracted in an order of a decreasing posting count from a larger posting count to a smaller positing count in a social networking service. The keywords acquired as the candidate information may be displayed selectively in the displaying of the acquired candidate information.

With this arrangement, the keywords that are extracted in the order of the decreasing search count with the search engine from a larger search count to a smaller search count, or the keywords that are extracted in the order of the decreasing posting count from a larger posting count to a smaller positing count in the social networking service are selectively displayed as the candidate information.

The user may select a new explanatory variable from the keywords that are extracted in the order of the decreasing search count with the search engine from a larger search count to a smaller search count, or the keywords that are extracted in the order of the decreasing posting count from a larger posting count to a smaller positing count in the social networking service.

In the demand prediction method, at least one explanatory variable may be acquired from another computer connected via a network in the acquiring of the candidate information if the error is determined to be the abnormal value.

If the error is determined to be the abnormal value in this arrangement, at least one explanatory variable is acquired as the candidate information from the other demand prediction apparatus connected via the network, and the acquired candidate information is selectively displayed.

Since at least one explanatory variable acquired as the candidate information from the other demand prediction apparatus connected via the network is selectively displayed if the error is determined to be the abnormal value, the explanatory variable used on the other the demand prediction apparatus is displayed to the user. The user may thus easily select the new explanatory variable.

The demand prediction method may further include determining whether the acquired new explanatory variable satisfies a predetermined condition, updating the prediction model in accordance with the new explanatory variable if the acquired new explanatory variable is determined to satisfy the predetermined condition, and storing the new explanatory variable as a correction explanatory variable that is to correct a prediction value of a demand calculated using the prediction model, instead of updating the prediction mode, if the new explanatory variable is determined not to satisfy the predetermined condition.

With this arrangement, the demand prediction method determines whether the acquired new explanatory variable satisfies the predetermined condition. If the acquired new explanatory variable is determined to satisfy the predetermined condition, the prediction model is updated in accordance with the new explanatory variable. If the acquired new explanatory variable is determined not to satisfy the predetermined condition, the prediction model is not updated. The new explanatory variable is stored as the correction explanatory variable to correct the prediction value of the amount of the demand calculated using the prediction model.

Since the prediction model is updated in accordance with the new explanatory variable if the acquired new explanatory variable is determined to satisfy the predetermined condition, the amount of the demand is predicted at a higher accuracy level. If the acquired new explanatory variable is determined not to satisfy the predetermined condition, the prediction model is not updated, and the new explanatory variable is stored as the correction explanatory variable to correct the prediction value of the amount of the demand calculated using the prediction model. The prediction value of the amount of the demand is corrected using the stored correction explanatory variable.

The demand prediction method may further include calculating an affecting value on the increase or the decrease in the amount of the demand on a per correction explanatory variable basis, and correcting the prediction value in response to the calculated affecting value.

With this arrangement, the affecting value on the increase or the decrease in the amount of the demand is calculated on a per correction explanatory variable basis, and the prediction value is corrected in response to the calculated affecting value. A higher accuracy prediction value is thus calculated.

The demand prediction method may further include determining that the new explanatory variable does not satisfy the predetermined condition if changes in the measurement value of the new explanatory variable within a predetermined period of time are smaller in number than a predetermined count.

With this arrangement, if the changes in the measurement value of the new explanatory variable within a predetermined period of time are smaller in number than a predetermined count, the new explanatory variable is determined not to satisfy the predetermined condition. If the new explanatory variable does not affect the increase or the decrease in the amount of the demand on a daily basis, the new explanatory variable is not reflected in the prediction model. The prediction accuracy of the amount of the demand is thus increased.

The demand prediction method may further include determining that the error is the abnormal value if the absolute value of the error is above a threshold value.

The demand prediction method determines whether the absolute value of the error is above the predetermined threshold value. If the absolute value of the error is determined to be above the predetermined threshold value, the error is determined to be the abnormal value. If the absolute value of the error is determined to be not above the predetermined threshold value, the error is determined not to be the abnormal value.

According to another aspect of the disclosure, there is provided a demand prediction apparatus that predicts an amount of a future demand. The demand prediction apparatus includes an error calculator that calculates an error between a prediction value of an amount of a past demand and a measurement value of the amount of the past demand, the prediction value of the amount of the past demand being calculated by inputting a measurement value of a past explanatory variable to a prediction model that is constructed in accordance with a measurement value of an amount of a demand at a predetermined location and an explanatory variable that serves as an external factor that affects an increase or a decrease in the amount of the demand at the predetermined location, an explanatory variable acquirer that determines whether the error calculated by the explanatory variable calculator is an abnormal value, and acquires a new explanatory variable if the error is determined to be the abnormal value, and a demand predictor that updates the prediction model in accordance with the new explanatory variable acquired by the explanatory variable acquirer, and newly predicts an amount of a future demand using the updated prediction model.

According to this aspect, the error calculator calculates the error between the prediction value of the amount of the past demand and the measurement value of the amount of the past demand. The prediction value of the amount of the past demand is calculated by inputting the measurement value of the past explanatory variable to the prediction model that is constructed in accordance with the measurement value of the amount of the demand at the predetermined location and the explanatory variable that serves as the external factor that affects the increase or the decrease in the amount of the demand at the predetermined location. The explanatory variable acquirer determines whether the calculated error is the abnormal value, and acquires the new explanatory variable if the error is determined to be the abnormal value. The demand predictor updates the prediction model in accordance with the acquired new explanatory variable, and newly predicts the amount of the future demand using the updated prediction model.

The error between the measurement value of the amount of the past demand and the prediction value resulting from the prediction model is calculated, and the new explanatory variable is acquired based on the calculated error. An efficient explanatory variable is thus acquired in a manner free from the variation in the demand amount caused by the explanatory variable accounted for in the prediction mode in advance. In this way, the number of input operations by the user is reduced, the time to acquire the explanatory variable is decreased, and the prediction accuracy of the demand amount is increased.

According to another aspect of the disclosure, there is provided a non-transitory computer-readable recording medium storing a demand prediction program causing a computer to perform a process to predict an amount of a future demand. The process includes calculating an error between a prediction value of an amount of a past demand and a measurement value of the amount of the past demand, the prediction value of the amount of the past demand being calculated by inputting a measurement value of a past explanatory variable to a prediction model that is constructed in accordance with a measurement value of an amount of a demand at a predetermined location and an explanatory variable that serves as an external factor that affects an increase or a decrease in the amount of the demand at the predetermined location, determining whether the calculated error is an abnormal value, and acquiring a new explanatory variable if the error is determined to be the abnormal value, and updating the prediction model in accordance with the acquired new explanatory variable, and newly predicting an amount of a future demand using the updated prediction model.

With this arrangement, the error between the prediction value of the amount of the past demand and the measurement value of the amount of the past demand is calculated. The prediction value of the amount of the past demand is calculated by inputting the measurement value of the past explanatory variable to the prediction model that is constructed in accordance with the measurement value of the amount of the demand at the predetermined location and the explanatory variable that serves as the external factor that affects the increase or the decrease in the amount of the demand at the predetermined location. It is determined whether the calculated error is the abnormal value. If the error is determined to be the abnormal value, the new explanatory variable is acquired. The prediction model is updated in accordance with the acquired new explanatory variable. The amount of the future demand is predicted using the updated prediction model.

The error between the measurement value of the amount of the past demand and the prediction value resulting from the prediction model is calculated, and the new explanatory variable is acquired based on the calculated error. An efficient explanatory variable is thus acquired in a manner free from the variation in the demand amount caused the explanatory variable accounted for in the prediction mode in advance. In this way, the number of input operations by the user is reduced, the time to acquire the explanatory variable is decreased, and the prediction accuracy of the demand amount prediction is increased.

An embodiment of the disclosure is described below with reference to the attached drawings. The embodiment is only an example of the disclosure and is not intended to limit the scope of the disclosure.

1.1 Entire Configuration of Demand Prediction Apparatus

FIG. 1 is a block diagram generally illustrating the entire configuration of a demand prediction apparatus 100 of the embodiment of the disclosure. Referring to FIG. 1, the single demand prediction apparatus 100 is employed. The demand prediction apparatus 100 includes an input unit 110, a processor 120, and a display 130.

The demand prediction apparatus 100 may be a server, a personal computer, a smart phone, or a tablet computer, and is an information processing apparatus with a computing function.

The input unit 110 may include a pointing device, such as a keyboard and a mouse of a computer, a voice input device, such as a microphone, and a touchpanel of a tablet computer. The input unit 110 receives an input from a user.

The processor 120 includes a microprocessor and a memory, included in a personal computer, for example. The memory stores a computer program, and the microprocessor implements the function of the processor 120 when the microprocessor operates in accordance with the computer program.

The display 130 includes a monitor of the personal computer or a display of the tablet computer.

Figure 2:
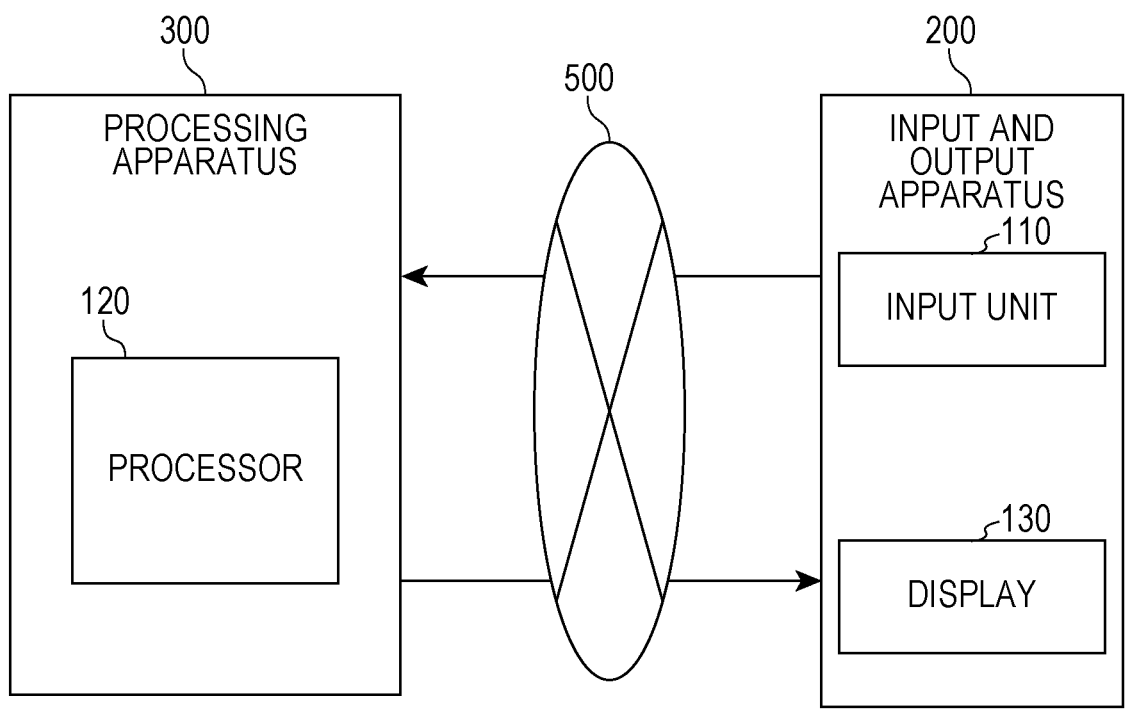
FIG. 2 is a block diagram generally illustrating a demand prediction apparatus as a modification of the embodiment of the disclosure.

FIG. 2 is a block diagram generally illustrating the entire configuration of a demand prediction apparatus as a modification of the embodiment of the disclosure. In the demand prediction apparatus of FIG. 2, the input unit 110 and the display 130 are in a separate device. The demand prediction apparatus includes an input and output apparatus 200 and a processing apparatus 300.

The processing apparatus 300 is connected to the input and output apparatus 200 via a network 500, for example.

The processing apparatus 300 includes a communication unit (not illustrated) that communicates with the input and output apparatus 200 via the network 500. The communication unit may include a communication circuit, for example.

The input and output apparatus 200 includes a communication unit (not illustrated) to communicate with the processing apparatus 300 via the network 500. The communication unit may include a communication circuit, for example.

The communication unit of the processing apparatus 300 transmits to the input and output apparatus 200 via the network 500 information that is used to cause the display 130 in the input and output apparatus 200 to display a predetermined screen if process results satisfy a predetermined condition.

The communication unit in the input and output apparatus 200 also outputs to the display 130 information that is used to cause the display 130 to display the predetermined received screen.

The communication unit in the input and output apparatus 200 transmits information input from the input unit 110 to the processing apparatus 300 via the network 500. The communication unit in the processing apparatus 300 outputs the received input information to the processor 120. As a result, the processor 120 acquires the information input from the input unit 110.

The input and output apparatus 200 may include a personal computer, a smart phone, a feature phone, or a tablet computer, and is provided with an input function and an output function, and connectable with the network 500.

The processing apparatus 300 may include a server, a personal computer, a smart phone, a feature phone, or a tablet computer, and is an information processing apparatus with a computing function.

The network 500 may be a priority network, such as Ethernet (registered trademark), a wireless network, such as a wireless local-area network (LAN), a public communication network, or a combination thereof. The public communication network is a communication network provided to public users by a telecommunications corporation, and may include the public telephone network or the integrated services digital network (ISDN).

In this example, the input and output apparatus 200 and the processing apparatus 300 are separate devices. The disclosure is not limited to this configuration. One of the input unit 110, the processor 120, and the display 130 may be housed in a device separate from another device that houses the remaining two devices. As illustrated in FIG. 2, the input and output apparatus 200 is connected to the processing apparatus 300 via the network 500. Alternatively, the input and output apparatus 200 and the processing apparatus 300 may be connected via a cable, such as a high-definition multimedia interface (HDMI) (registered trademark) cable or a universal serial bus (USB) cable.

Multiple input and output apparatuses 200 may be connected to the processing apparatus 300 via the network 500.

In the following discussion of the embodiment, a single demand prediction apparatus is used as illustrated in FIG. 1. The amount of a demand is intended to mean an amount of a demand at a predetermined location. In the embodiment, the number of visiting customers to a store at a specific location is an example of an amount of a demand, and the demand prediction apparatus predicts as the amount of the demand the number of visiting customers every predetermined period of time (for example, on a per hour, per day, per month, or per year basis). In the embodiment, the typical predetermined period of time is one day.

The disclosure is not limited to the prediction of the number of visiting customers. The target of the prediction of the amount of demand may include power consumption at the store, a volume of traffic in front of the store, or an amount of sales at the store.

1.2 Configuration of Demand Prediction Apparatus

Figure 3:
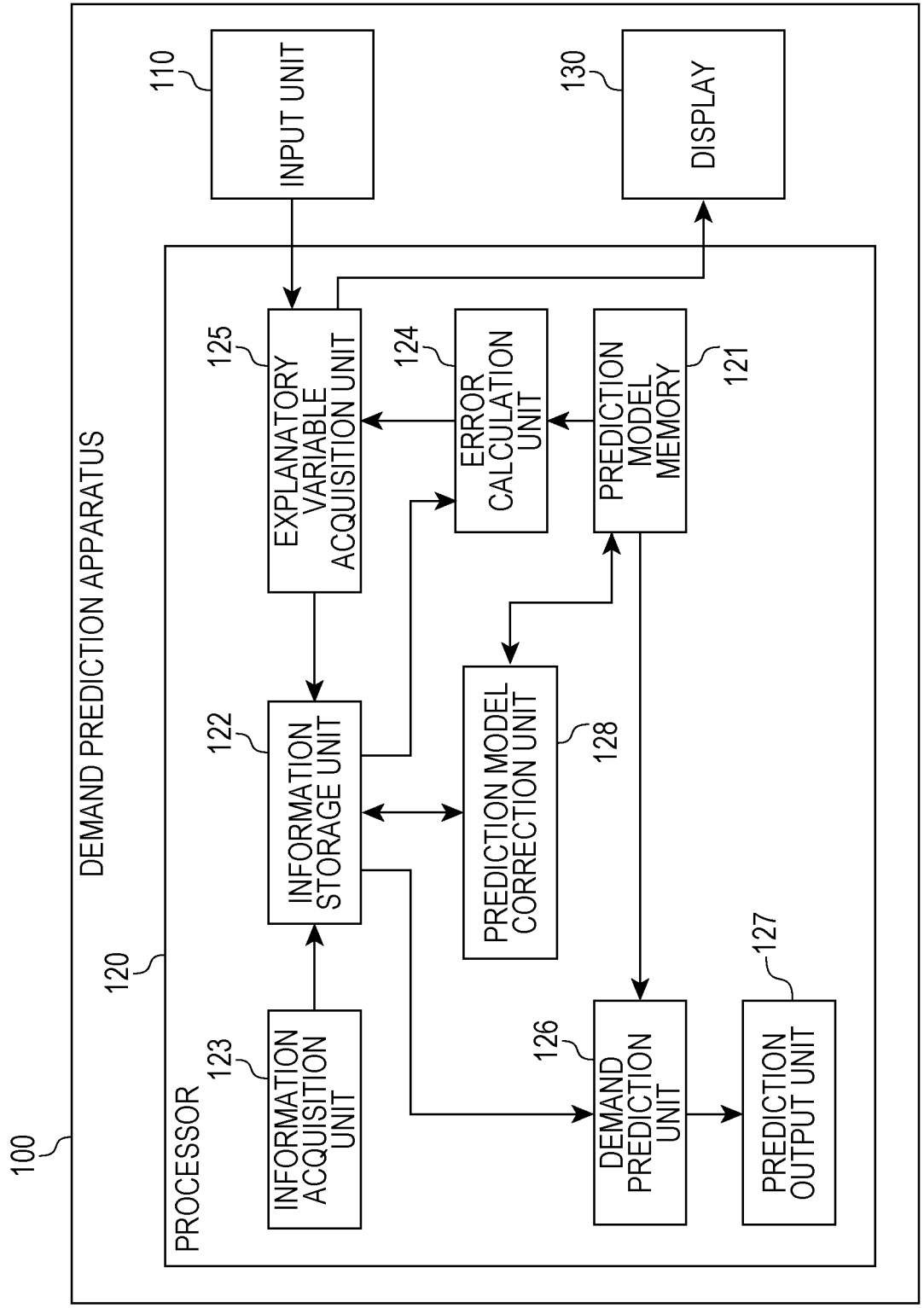
FIG. 3 is a functional block diagram illustrating the demand prediction apparatus of the embodiment of the disclosure.

FIG. 3 is a functional block diagram illustrating the demand prediction apparatus 100 of the embodiment of the disclosure.

The demand prediction apparatus 100 predicts an amount of a future demand. The demand prediction apparatus 100 includes the input unit 110, the processor 120, and the display 130.

The processor 120 includes a prediction model memory 121, an information storage unit 122, an information acquisition unit 123, an error calculation unit 124, an explanatory variable acquisition unit 125, a demand prediction unit 126, a prediction output unit 127, and a prediction model correction unit 128.

The prediction model memory 121 is a non-volatile memory or a magnetic disk, and includes an information storage region. The prediction model memory 121 stores prediction model information to predict a demand. For example, the prediction model uses the multiple regression analysis, the neural network, the support vector machine, or the decision tree, and outputs prediction results in response to input information. For example, the prediction model calculates a probability distribution representing the predicted number of visiting customers of a target day, based on the day of the week as the target day of the demand prediction or based on weather forecast on the target day, and then outputs the calculated probability distribution as the prediction results.

The information storage unit 122 is a non-volatile memory or a magnetic disk, and includes an information storage area. The information storage unit 122 stores a measurement value of the visiting customers, a variable name of an explanatory variable serving as input information to the prediction model stored on the prediction model memory 121, and a measurement value of each explanatory variable.

The information storage unit 122 is a database system that is expanded on a non-volatile memory or a magnetic disk, for example. FIG. 4 illustrates an example of information stored on the information storage unit 122 of the embodiment of the disclosure. As illustrated in FIG. 4, the information storage unit 122 stores the date, the number of visiting customers, the day of the week, and the weather and the temperature of the day in association with each other. In the information of FIG. 4, the "day of the week", the "weather", and the "temperature" are the variable names of the explanatory variables, and "Wednesday", and "Fine" and "15.2" are measurement values of the explanatory variables.

The information acquisition unit 123 acquires new information at a predetermined timing, and stores the acquired information on the information storage unit 122. Every 24 hours, for example, the information acquisition unit 123 collects the measurement value of the customers having visited the store on the day (in this example, a value responsive to a total number of customers having visited the store on the day (throughout 24 hours of the day or the business hours of the day)), and then stores the measurement value on the information storage unit 122. The information acquisition unit 123 also acquires a future value or a prediction value of each explanatory variable, and then stores the value on the information storage unit 122. In accordance with the embodiment, the information acquisition unit 123 acquires each of these values from the external server. The disclosure is not limited to this method. The information acquisition unit 123 acquires each of these values by receiving the value from the user.

The error calculation unit 124 calculates an error (model error) between the prediction value of the amount of a past demand and the measurement value of the amount of the past value. The prediction value of the amount of the past demand is calculated by inputting a measurement value of a past explanatory variable to a prediction model that is constructed on a measurement value of an amount of a demand and an explanatory variable that serves as an external factor affecting an increase or a decrease in the amount of the demand. More specifically, the error calculation unit 124 calculates the model error from the prediction value calculated from the prediction model stored on the prediction model memory 121, and the measurement value of the visiting customers stored on the information storage unit 122. For example, the error calculation unit 124 inputs the measurement value of the past explanatory variable to the prediction model, and calculates the model error by comparing the prediction value output from the prediction model with the measurement value of the past visiting customers.

The error calculation unit 124 determines whether the calculated model error is an abnormal value. Upon determining that the model error is the abnormal value, the error calculation unit 124 sends a notification to the explanatory variable acquisition unit 125. Also, the error calculation unit 124 transmits information concerning the calculated model error to the explanatory variable acquisition unit 125. The determination condition as to whether the model error is the abnormal error depends on whether the absolute value of the model error is higher than a predetermined threshold value. For example, if the absolute value of the model error is higher than the predetermined threshold value, the error calculation unit 124 determines that the model error is the abnormal value. If the absolute value of the model error is equal to or below the predetermined threshold value, the error calculation unit 124 determines that the model error is not the abnormal value. The determination condition as to whether the model error on one day is the abnormal value may depend on whether the model error on that day falls greatly outside the distribution of the model error on another day.

The explanatory variable acquisition unit 125 receives the notification from the error calculation unit 124, and acquires a new explanatory variable that is not stored on the information storage unit 122. If the model error is determined to be the abnormal value, the explanatory variable acquisition unit 125 acquires a new explanatory variable.

The explanatory variable acquisition unit 125 acquires a new explanatory variable by receiving an input from the user. The explanatory variable acquisition unit 125 outputs to the display 130 notification information indicating that the model error is an abnormal value, and acquires information that the user has input in response to the notification information. The information input by the user is information that associates the name of the new explanatory variable, the past measurement value of the new explanatory variable, and information indicating the acquisition source of the future prediction value of the new explanatory variable. More specifically, the explanatory variable acquisition unit 125 acquires connection information to the database, a file path to a file that stores the explanatory variable, or uniform resource locator (URL) information of the Internet. The input unit 110 receives the new explanatory variable from the user.

The explanatory variable acquisition unit 125 stores the new explanatory variable on the information storage unit 122 in response to the information input from the input unit 110.

The prediction model correction unit 128 detects the new explanatory variable that has been stored onto the information storage unit 122. The prediction model correction unit 128 may receive the new explanatory variable from the explanatory variable acquisition unit 125 when the new explanatory variable is stored onto the information storage unit 122. The prediction model correction unit 128 updates the prediction model, based on the new explanatory variable acquired by the explanatory variable acquisition unit 125.

The prediction model correction unit 128 determines whether the new explanatory variable acquired by the explanatory variable acquisition unit 125 satisfies the predetermined condition. If the new explanatory variable is determined to satisfy the predetermined condition, the prediction model correction unit 128 updates the prediction model according to the new explanatory variable. The predetermined condition is that the number of observations of the explanatory variable is above a predetermined count during a predetermined past period of time.

The prediction model correction unit 128 determines that the new explanatory variable does not satisfy the predetermined condition if changes in the measurement value of the explanatory variable during the predetermined period of time is lower than a predetermined count, the new explanatory variable is determined not to satisfy the predetermined condition. For example, the presence or absence of an event (1 or 0) may be acquired as an explanatory variable. If the explanatory variable is "1" once every year (the event is conducted), the explanatory variable is not reflected in the prediction model.

If it is determined that the new explanatory variable has been observed by a predetermined count or more for a predetermined past period of time, the prediction model correction unit 128 updates the prediction model on the prediction model memory 121. If the prediction model correction unit 128 determines that the new explanatory variable has not been observed by the predetermined count or more for the predetermined past period of time, the new explanatory variable is set to be a correction explanatory variable and stored on the information storage unit 122. More specifically, if it is determined that the new explanatory variable has not been observed by the predetermined count or more for the predetermined past period of time, the prediction model correction unit 128 does not update the prediction model and stores the new explanatory variable as the correction explanatory variable that corrects the prediction value of the amount of the demand calculated using the prediction model.

The demand prediction unit 126 inputs to the prediction model the value of a future explanatory variable stored on the information storage unit 122, and calculates a prediction value of the number of future visiting customers (amount of demand). The demand prediction unit 126 newly predicts the amount of a future demand using the prediction model updated by the prediction model correction unit 128. If the correction explanatory variable is stored on the information storage unit 122, the demand prediction unit 126 corrects the prediction value of the visiting customers using the information concerning the correction explanatory variable. More specifically, the demand prediction unit 126 calculates an affecting value on an increase or a decrease in the amount of the demand on a per correction explanatory variable basis, and corrects the prediction values in response to the calculated affecting value. The demand prediction unit 126 transmits the prediction value of the calculated number of future visiting customers to the prediction output unit 127.

The prediction output unit 127 outputs the prediction value of the number of future visiting customers received from the demand prediction unit 126. For example, the prediction output unit 127 may output the prediction value to the display 130. The prediction output unit 127 may output the prediction value to an external apparatus, such as an automatic ordering device (not illustrated) that automatically places an order for a product.

1.3 Process of Demand Prediction Apparatus

The process of the demand prediction apparatus 100 is described with reference to FIG. 5.

Figure 5:
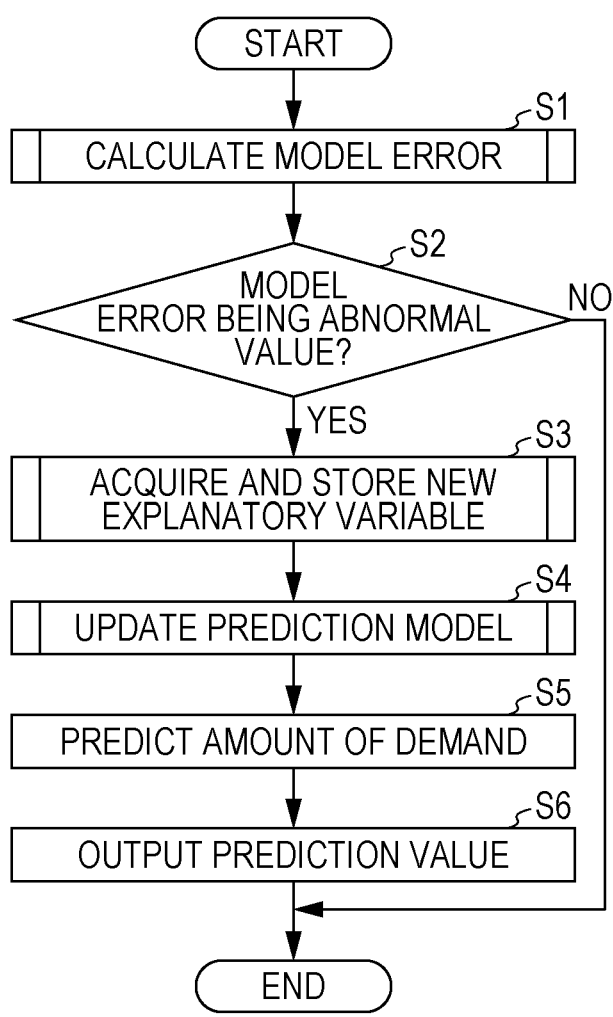
FIG. 5 is a flowchart illustrating a process performed by the demand prediction apparatus of the embodiment of the disclosure.

FIG. 5 is a flowchart illustrating a process performed by the demand prediction apparatus of the embodiment of the disclosure. In the discussion that follows, the information storage unit 122 stores the measurement value of an existing explanatory variable (A) and the measurement value of the number of visiting customers in a period of 30 days. As illustrated in FIG. 4, an example of the information stored on the information storage unit 122 includes the number of visiting customers, the day of the week, the weather, and the temperature for the latest 30 days. The storage information for the 30 days is updated every day. The prediction model is a multiple regression model that has been learned using the storage information of the 30 days stored on the information storage unit 122.

The error calculation unit 124 calculates the model error between the prediction value based on the prediction model and the measurement value of the number of visiting customers (step S1).

The error calculation unit 124 determines whether the calculated model error is an abnormal value (step S2). If the error calculation unit 124 determines that the calculated model error is not an abnormal value (no branch from step S2), the process ends.

On the other hand, if the error calculation unit 124 determines that the calculated model error is an abnormal value (yes branch from step S2), the explanatory variable acquisition unit 125 acquires a new explanatory variable (B), and stores the new explanatory variable (B) and then stores the acquired new explanatory variable onto the information storage unit 122 (step S3). If the error calculation unit 124 determines that the model error is the abnormal value, the error calculation unit 124 sends a notification to the explanatory variable acquisition unit 125 and the explanatory variable acquisition unit 125 receives the notification from the error calculation unit 124.

The prediction model correction unit 128 updates the prediction model stored on the prediction model memory 121 in accordance with the new explanatory variable (B) acquired by the explanatory variable acquisition unit 125 (step S4). The prediction model correction unit 128 detects the new explanatory variable added onto the information storage unit 122, and then determines whether the prediction model is to be updated or not. Upon determining that the prediction model is to be updated, the prediction model correction unit 128 updates the prediction model stored on the prediction model memory 121. More specifically, the prediction model correction unit 128 constructs the prediction model using the existing explanatory variable (A) and the new explanatory variable (B). On the other hand, upon determining that the prediction model is not to be updated, the prediction model correction unit 128 stores on the information storage unit 122 the new explanatory variable (B) as the correction explanatory variable.

The demand prediction unit 126 predicts the amount of the demand (the number of visiting customers) by reading the value of the explanatory variable from the information storage unit 122, and inputting the read value of the explanatory variable to the prediction model (step S5). The information acquisition unit 123 acquires the value of the explanatory variable on a day that is a prediction target, and stores the value of the explanatory variable onto the information storage unit 122. If the correction explanatory variable is stored on the information storage unit 122, the demand prediction unit 126 corrects the prediction value in accordance with the information concerning the correction explanatory variable.

The prediction output unit 127 outputs the prediction value of the amount of the demand (the number of visiting customers) calculated by the demand prediction unit 126 (step S6). If the demand prediction apparatus 100 includes the processor 120 and the display 130 as illustrated in FIG. 1, the prediction output unit 127 outputs the prediction value of the calculated amount of the demand (the number of visiting customers) to the display 130 in the demand prediction apparatus 100, and the display 130 displays the prediction value of the calculated amount of the demand (the number of visiting customers).

The processing apparatus 300 including the processor 120 may be connected to the input and output apparatus 200 including the display 130 via the network 500 as illustrated in FIG. 2. In such a case, using the communication unit of the processing apparatus 300, the prediction output unit 127 transmits to the input and output apparatus 200 via the network 500 information that is used to cause the display 130 to display the prediction information of the calculated amount of the demand (the number of visiting customers). Upon receiving the information, the communication unit of the input and output apparatus 200 outputs the information to the display 130. The display 130 displays the calculated amount of the demand (the number of visiting customers).

The prediction output unit 127 may also output the value of the explanatory variable and the value of the correction explanatory variable on the prediction target day together with the calculated amount of the demand (the number of visiting customers).

In the process of the flowchart of FIG. 5, the acquisition of the new explanatory variable, the updating of the prediction model, and the prediction of the amount of the demand are successively performed. These steps do not necessarily have to be performed in succession, and may be performed independently of each other.

1.4 Process of Error Calculation Unit

The process of the error calculation unit 124 is described below with reference to FIG. 6.

Figure 6:
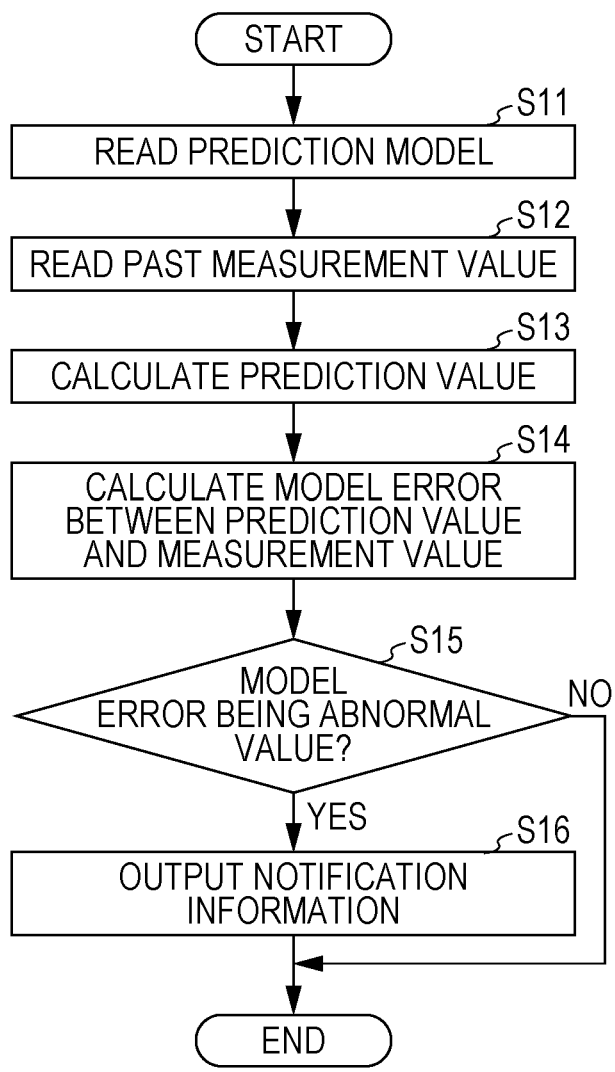
FIG. 6 is a flowchart illustrating a process performed by an error calculation unit of the embodiment of the disclosure.

FIG. 6 is a flowchart illustrating a process performed by the error calculation unit 124 of the embodiment of the disclosure.

The error calculation unit 124 reads the prediction model from the prediction model memory 121 (step S11).

The error calculation unit 124 reads from the information storage unit 122 the measurement values of the number of visiting customers for a past period of time (the past 30 days in this embodiment), and the measurement values of the existing explanatory variable (A) for the past period of time (step S12).

The error calculation unit 124 inputs the measurement values of the existing explanatory variable (A) for the past period of time to the prediction model, and calculates the prediction values of visiting customers for the past period of time. For example, the error calculation unit 124 calculates a value by inputting to the prediction model the measurement value of the explanatory variable (A) on each of the 30 days illustrated in FIG. 4 and read from the information storage unit 122, and then treats the calculated value as a prediction value of the number of visiting customers on that day. In accordance with the embodiment, the prediction value of the number of visiting customers is calculated on each of the 30 days (step S13).

The error calculation unit 124 compares the prediction value of the number of visiting customers for the 30 days calculated in step S13 with the measurement value of the number of visiting customers for the 30 days read in step S12, thereby calculating the model error for the 30 days. More specifically, the error calculation unit 124 calculates as the model error a difference between the prediction value on the target day and the measurement value of the number visiting customers on the target day. In the embodiment, the model error is calculated on each of the 30 days (step S14).

In accordance with the embodiment, the prediction value of the amount of the demand, the measurement value of the amount of the demand, and the model error are calculated on each day. The disclosure is not limited to this method. For example, the measurement value of the amount of the demand and the measurement value of the explanatory variable (A) may be measured in unit time, and these measurement values may be stored in association with each other on the information storage unit 122. The multiple regression model learned using the measurement values is set to be a prediction model. The prediction value of the amount of the demand and the model error are thus calculated in unit time.

The error calculation unit 124 determines whether each of the model errors calculated for the 30 days in step S14 is the abnormal value (step S15). The determination as to whether the model error is the abnormal value is performed depending on whether the absolute value of the model error is above a predetermined threshold value. The predetermined threshold value may be stored as a fixed value or may be calculated from the distribution of the model errors. For example, if the distribution of the model errors for the 30 days is approximated using a normal distribution with a standard deviation of 5 and a mean value of 0, the error calculation unit 124 simply determines whether each of the model errors for the 30 days is outside a confidence interval of 95% (whether the model error is equal to or above 10). The error calculation unit 124 may output the model errors for the 30 days to the display 130 and receive from an input from the user as to whether the model error is the abnormal value.

The determination result in step S15 indicates that the model error is the abnormal value, more specifically, that the absolute value of the model error is above the threshold value (yes branch from step S15), the error calculation unit 124 outputs notification information to the explanatory variable acquisition unit 125 (step S16). The notification information may include the model error that is the abnormal value, date information concerning the day when the model error as the abnormal value has been generated, or all the model errors for the 30 days.

The date information of the day on which the model error corresponding to the abnormal value has occurred may be date information of the day on which the measurement operation to acquire the number of visiting customers to be used to calculate the model error as the abnormal value has been performed. The date information may also be referred to as time period information.

If the model error is determined not be the abnormal value, more specifically, all the model errors for the 30 days are determined not to exceed the predetermined threshold value (no branch from step S15), the error calculation unit 124 ends the process without outputting the notification information.

1.5 Process of Explanatory Variable Acquisition Unit

The process of the explanatory variable acquisition unit 125 is described with reference to FIG. 7.

Figure 7:
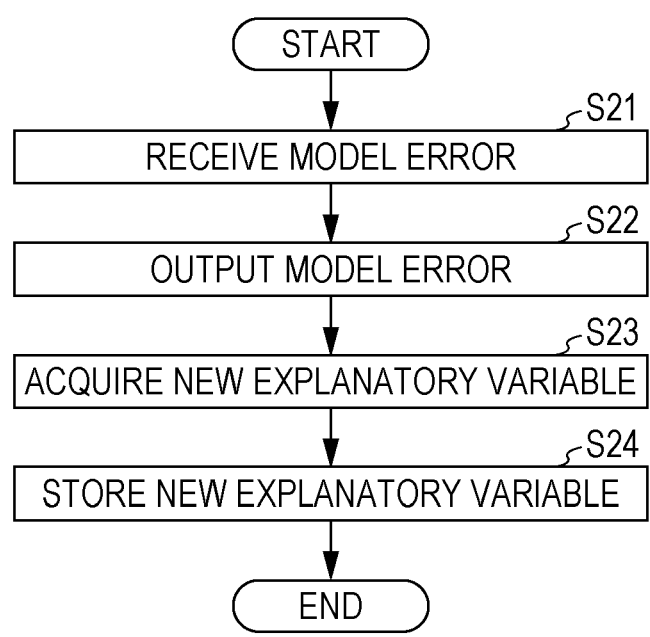
FIG. 7 is a flowchart illustrating a process performed by an explanatory variable acquisition unit of the embodiment of the disclosure.

FIG. 7 is a flowchart illustrating a process performed by the explanatory variable acquisition unit 125 of the embodiment of the disclosure.

The explanatory variable acquisition unit 125 receives the model error from the error calculation unit 124 (step S21). The explanatory variable acquisition unit 125 receives communication information from the error calculation unit 124.

The explanatory variable acquisition unit 125 outputs the received model error to the display 130 (step S22). The display 130 time-sequentially displays the model error as the abnormal value.

FIG. 8 illustrates an example of a display screen displaying a model error that is an abnormal value. A display screen 800 of FIG. 8 displays, in a table format, the model errors that are abnormal values. The display 130 displays the display screen 800 that associates the day on which the model error corresponding to the abnormal value has occurred, the measurement value of the amount of the past demand, the prediction value of the amount of the past demand, and the model error corresponding to the abnormal value.

Figure 9:
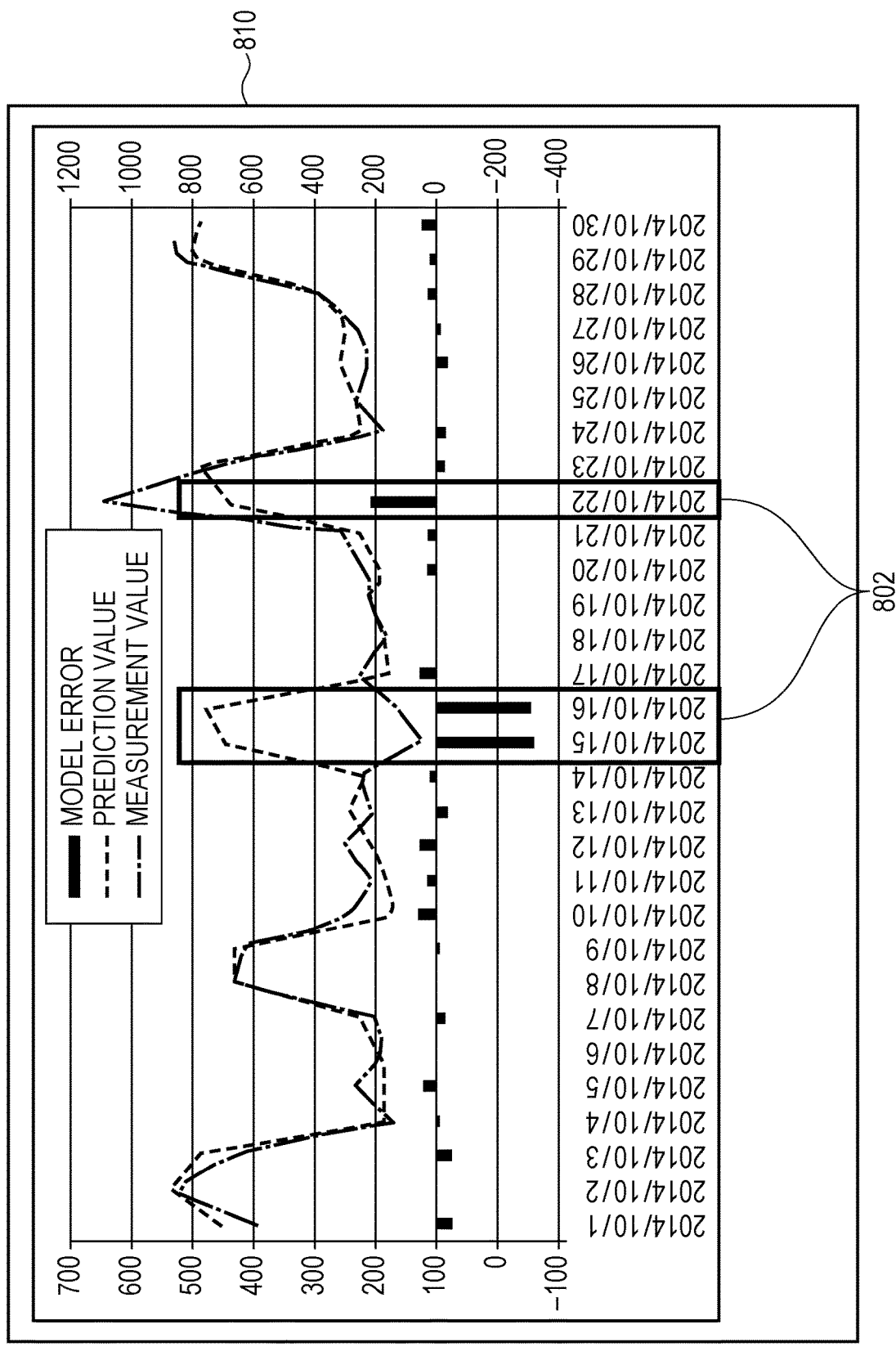
FIG. 9 illustrates another example of the display screen displaying the model error that is an abnormal value.

FIG. 9 illustrates another example of the display screen displaying the model error that is an abnormal value. A display screen 810 of FIG. 9 displays, in a graph, the model errors that are abnormal values. The display 130 displays the display screen 810 that associates the dates, the measurement values of the amount of the demands for the past 30 days (dot-dash line), the prediction values of the amount of the demands for the past 30 days (broken line), and the model errors for the past 30 days (bar graphs). As illustrated in FIG. 9, the abscissa represents the dates, the left ordinate represents the measurement value and the prediction value, and the right ordinate represents the model error. The display 130 also displays markers 802 on the days on which the model errors corresponding to the abnormal values have occurred.

The explanatory variable acquisition unit 125 acquires a new explanatory variable (B) input by the user (step S23). The user input is entered on the display screen output in step S22. For example, the display screen of FIG. 8 displays input buttons 801 corresponding to the model errors. When the user clicks on the input button 801, the inputting of the new explanatory variable (B) starts.

Figure 10:
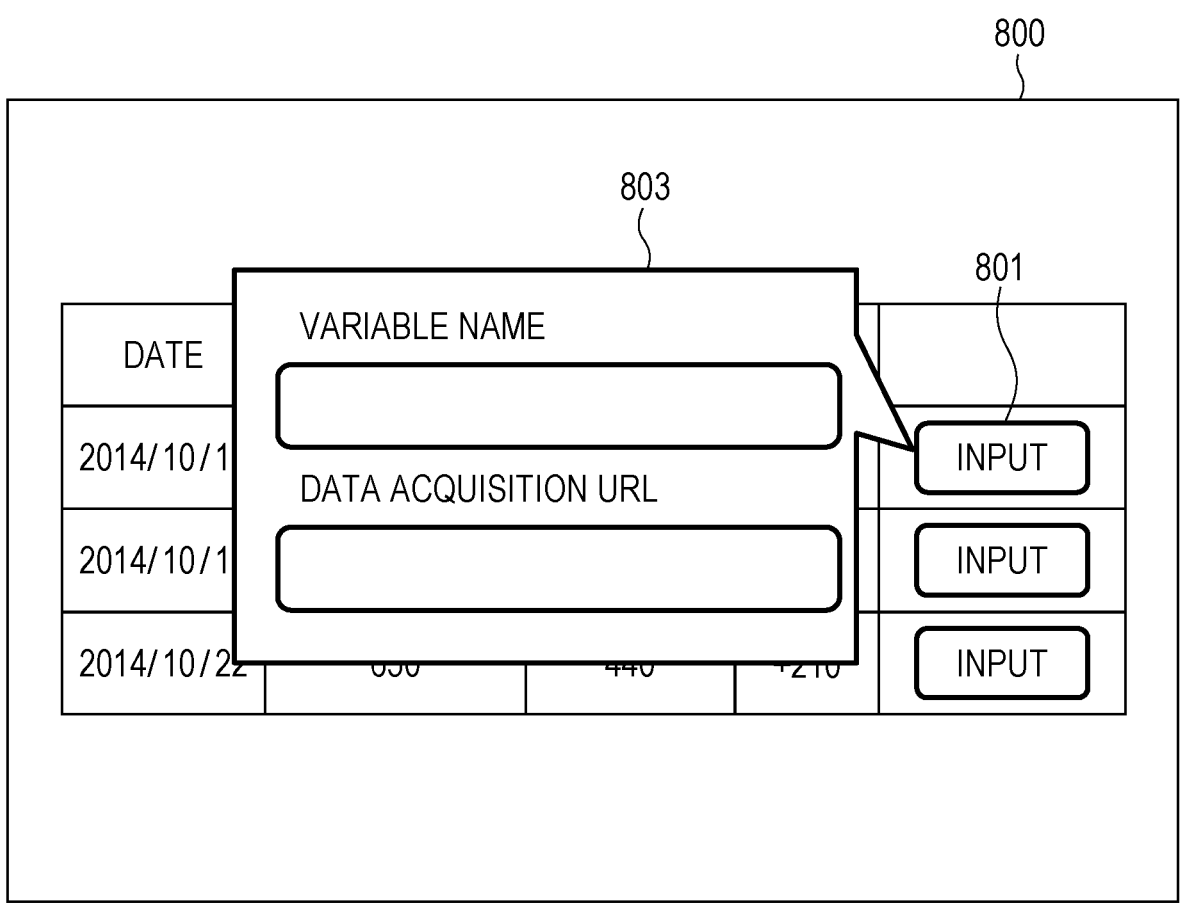
FIG. 10 illustrates an example of a display screen that is displayed when a new explanatory variable is received.

FIG. 10 illustrates an example of a display screen that is displayed and is ready to receive a new explanatory variable.

When the button 801 is pressed by the user as illustrated in FIG. 10, an input form 803 appears to receive an explanatory variable name and a uniform resource locator (URL) through which information about the explanatory variable is acquired. The input form 803 may be displayed in an overlay fashion on the screen that displays the model error corresponding to the abnormal value, or may be displayed on a different screen shifted from the present screen. The information received in the input form 803 is the name of the explanatory variable and the acquisition source of the information of the explanatory variable. The acquisition source may not necessarily have to be a URL. For example, a file path to a comma-separated value (CSV) file or an access path to a database may be received as the acquisition source of the information of the explanatory variable. The input form 803 may not necessarily have to be displayed by clicking on the button 801. For example, the input form 803 may be displayed by clicking the marker 802 of FIG. 9.

Figure 11:
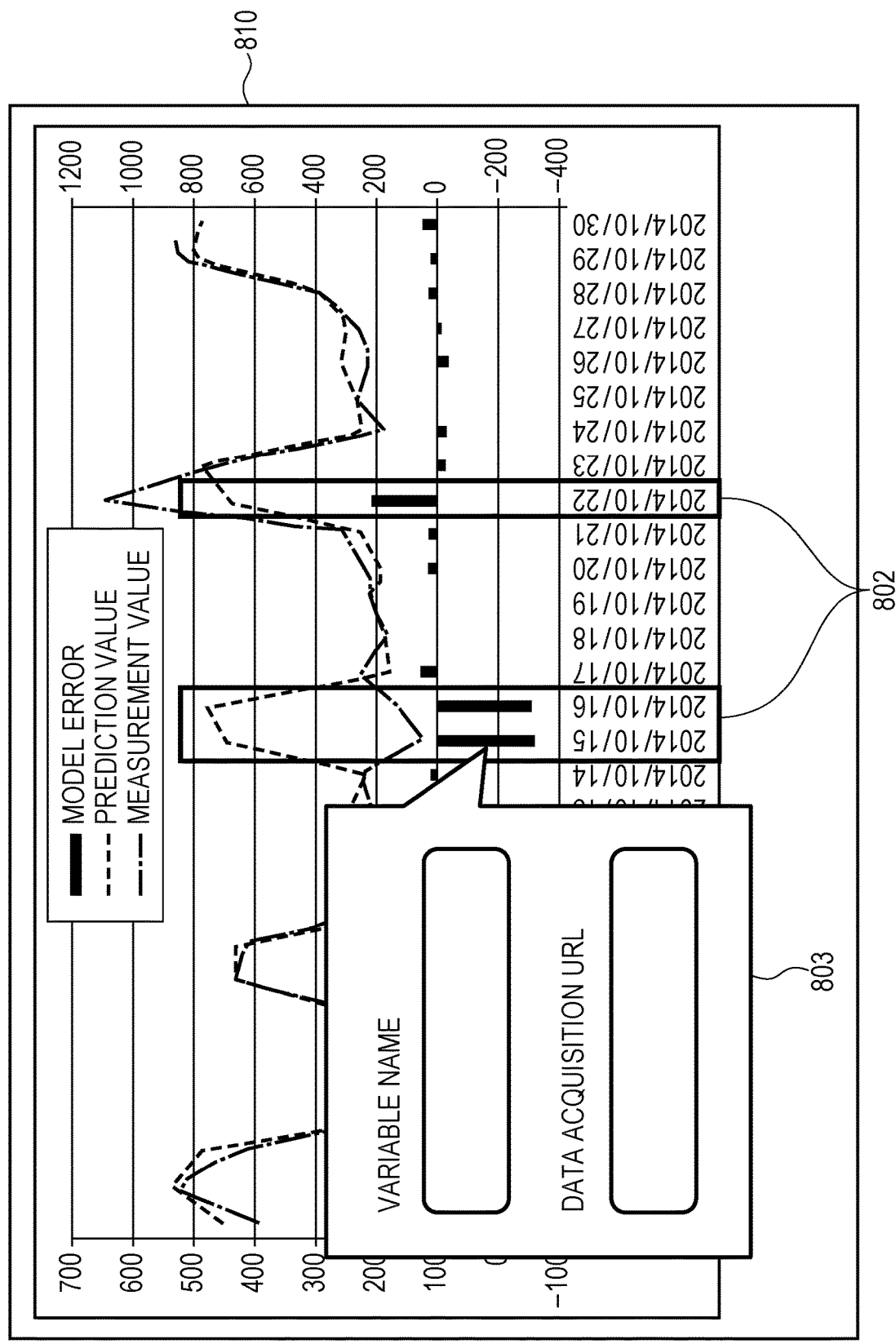
FIG. 11 illustrates another example of the display screen that is displayed when a new explanatory variable is received.

FIG. 11 illustrates another example of the display screen that is displayed and is ready to receive a new explanatory variable. The display screen of FIG. 11 displays the markers 802 that allow the user to view the day on which the model error corresponding to the abnormal value has been generated.

When the marker 802 is clicked by the user as illustrated in FIG. 11, an input form 803 appears to receive an explanatory variable name and a URL through which information about the explanatory variable is acquired. The input form 803 may be displayed in an overlay fashion on the screen that displays the model error corresponding to the abnormal value, or may be displayed on a different screen shifted from the present screen.

The input unit 110 may receive the new explanatory variable through a speech dialog.

The explanatory variable acquisition unit 125 stores the acquired new explanatory variable (B) onto the information storage unit 122 (step S24).

The explanatory variable acquisition unit 125 may output hint information to the display 130 when the model error is output to the display 130.

Figure 12:
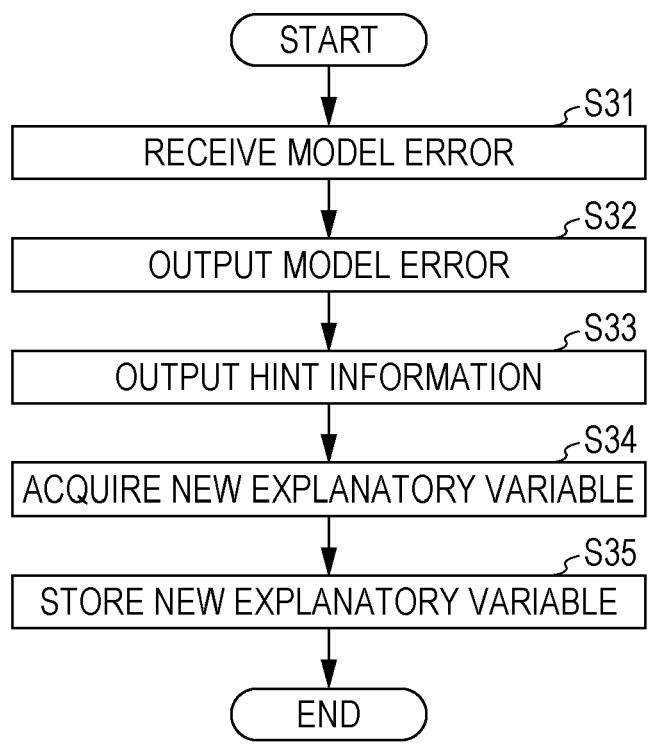
FIG. 12 is a flowchart illustrating a process performed by an explanatory variable acquisition unit as a modification of the embodiment of the disclosure.

FIG. 12 is a flowchart illustrating a process performed by the explanatory variable acquisition unit 125 as a modification of the embodiment of the disclosure. Operations in steps S31, S32, S34, and S35 of FIG. 12 are identical to those in steps S21 through S24 of FIG. 7, and the discussion thereof is omitted herein.

In step S33, the explanatory variable acquisition unit 125 outputs the hint information to the display 130. If the error calculation unit 124 determines that the model error is the abnormal value, the explanatory variable acquisition unit 125 acquires the hint information (candidate information) representing at least one candidate of the new explanatory variables. The display 130 selectively displays the acquired hint information.

The hint information includes multiple keywords that are extracted in the decreasing search count order with a search engine from a larger count to a smaller count, or multiple keywords that are extracted in the decreasing posting count order from a larger count to a smaller count in the social networking service. If the error calculation unit 124 determines that the model error is the abnormal value, the explanatory variable acquisition unit 125 acquires multiple keywords from an external server that provides the search engine or the social networking service. The display 130 selectively displays the multiple acquired keywords.

Using a technique, such as term frequency-inverse document frequency (TF-IDF), the explanatory variable acquisition unit 125 may extract a word that is not usually observed, and may output the extracted word as the hint information. When the hint information is acquired through the Internet, the explanatory variable acquisition unit 125 may acquire location information of a store for which an amount of a demand (the number of visiting customers) is predicted, and may acquire only keywords related to a local area of the store in accordance with the acquired location information.

Figure 13:
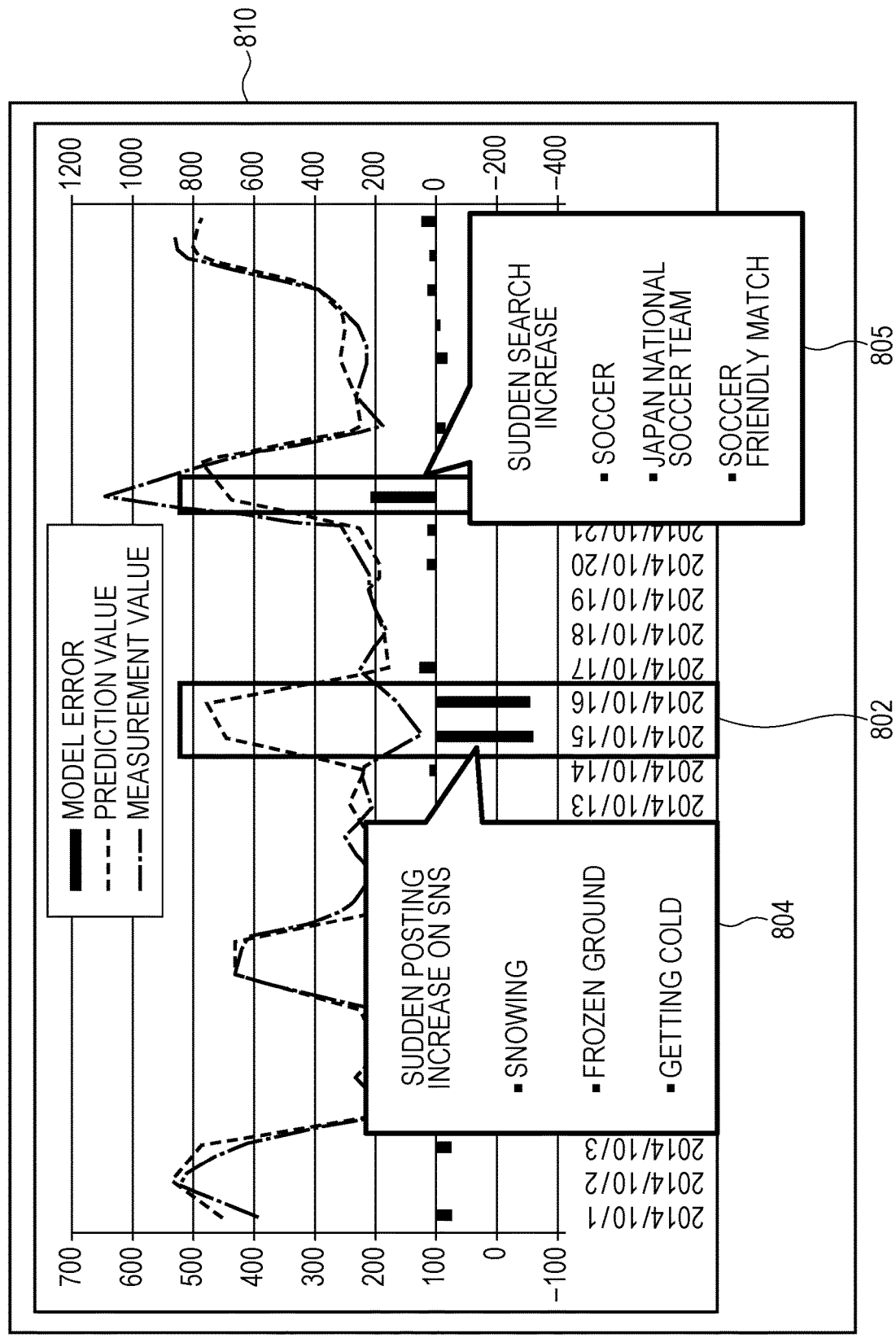
FIG. 13 illustrates an example of a display screen displaying hint information.

FIG. 13 illustrates an example of a display screen displaying hint information. Referring to FIG. 13, hint information 804 and 805 are displayed in an overlay fashion on the image displaying the model error corresponding to the abnormal value. For example, the hint information 804 indicates the top three ranking keywords in the posting count in the social networking service on the day when the model error corresponding to the abnormal value is generated. The hint information 805 indicates the top three ranking keywords in the search count with the search engine on the day when the model error corresponding to the abnormal value is generated.

The input unit 110 receives the user's selection of the new explanatory variable from the displayed hint information. The user may select a new explanatory variable from the displayed hint information. If there is no appropriate explanatory variable in the displayed hint information, the input unit 110 may receive a display switching command to display an input form that receives the new explanatory variable.

Since the hint information 804 and 805 are displayed in this way, the user may easily recognize the factor causing the model error, and easily input a new explanatory variable.

The hint information may include an explanatory variable stored on another demand prediction apparatus connected via the network.

Figure 14:
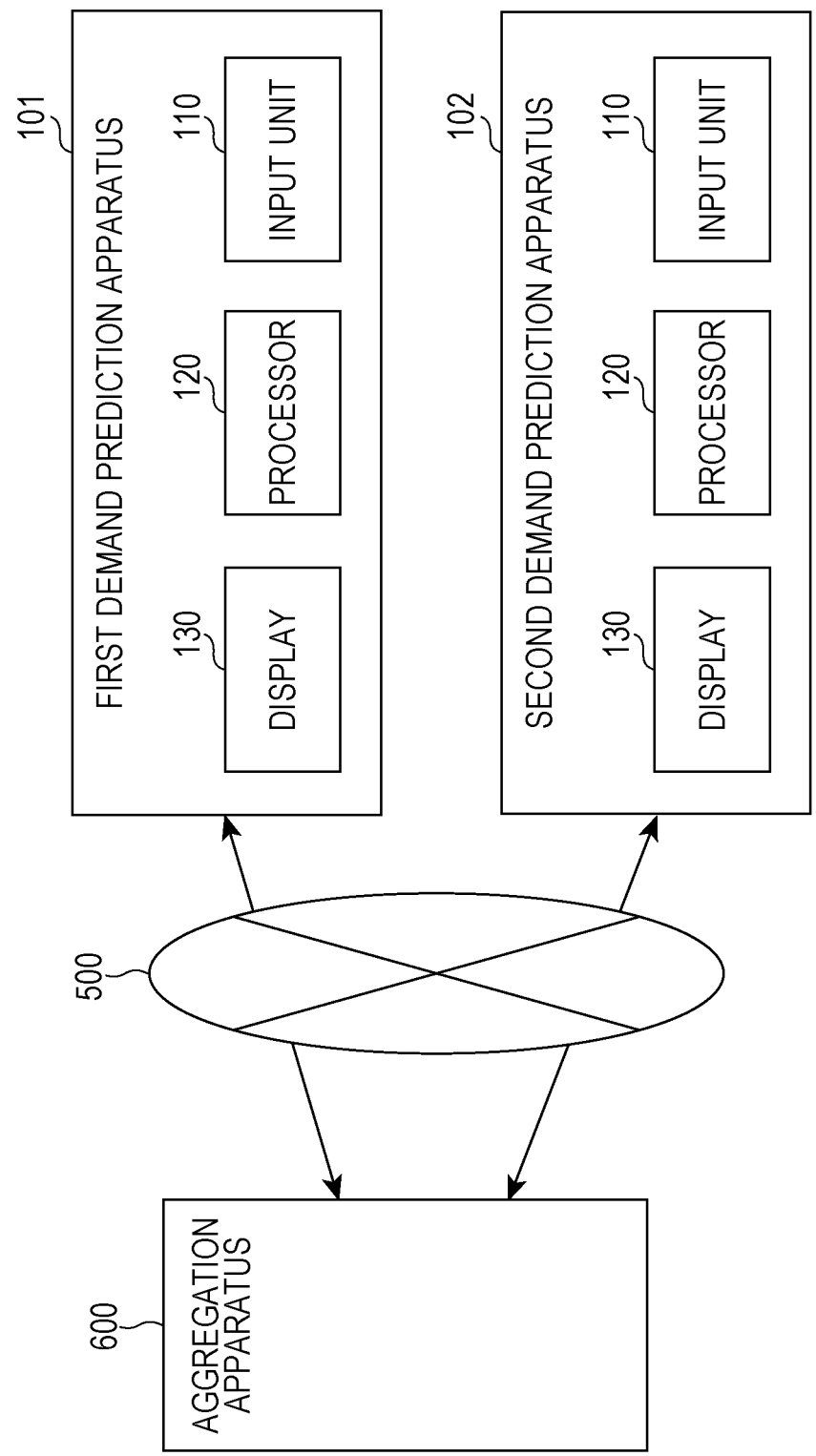
FIG. 14 is a block diagram illustrating a demand prediction system of the embodiment of the disclosure.

FIG. 14 is a block diagram illustrating a demand prediction system of the embodiment of the disclosure. The demand prediction system of FIG. 14 includes a first demand prediction apparatus 101, a second demand prediction apparatus 102, and an aggregation apparatus 600. The first demand prediction apparatus 101 includes an input unit 110, a processor 120, and a display 130. The second demand prediction apparatus 102 is identical in configuration to the first demand prediction apparatus 101, and includes an input unit 110, a processor 120, and a display 130.

The aggregation apparatus 600 is connected to each of the first demand prediction apparatus 101 and the second demand prediction apparatus 102 for communication. If the error calculation unit 124 determines that the model error is an abnormal value, the information acquisition unit 123 in the first demand prediction apparatus 101 acquires from one or more explanatory variables as the hint information from the second demand prediction apparatus 102. The information acquisition unit 123 transmits to the aggregation apparatus 600 request information that requests the explanatory variable of the first demand prediction apparatus 102 to be sent. Upon receiving the request information, the aggregation apparatus 600 acquires the explanatory variable from the second demand prediction apparatus 102, and transmits the acquired explanatory variable to the first demand prediction apparatus 101. The information acquisition unit 123 receives the explanatory variable from the aggregation apparatus 600, and then outputs the received explanatory variable to the explanatory variable acquisition unit 125. The explanatory variable acquisition unit 125 outputs the acquired explanatory variable to the display 130. The display 130 selectively displays the acquired hint information.

The first demand prediction apparatus 101 may directly acquire the explanatory variable from the second demand prediction apparatus 102. Because of security reasons, the first demand prediction apparatus 101 desirably acquires the explanatory variable via the aggregation apparatus 600. If the first demand prediction apparatus 101 acquires the explanatory variables from multiple demand prediction apparatuses, it is desirable that the aggregation apparatus 600 acquire the explanatory variables from the multiple demand prediction apparatuses and transmit the acquired explanatory variables to the first demand prediction apparatus 101 together at a time. With this arrangement, the first demand prediction apparatus 101 is free from acquiring individually the explanatory variables from the multiple demand prediction apparatuses.

The explanatory variable acquisition unit 125 in the first demand prediction apparatus 101 desirably outputs to the display 130 as the hint information the explanatory variable that is not stored on the information storage unit 122, out of the explanatory variables acquired from the second demand prediction apparatus 102. This arrangement controls display redundancy of the explanatory variable to the user.

Figure 15:
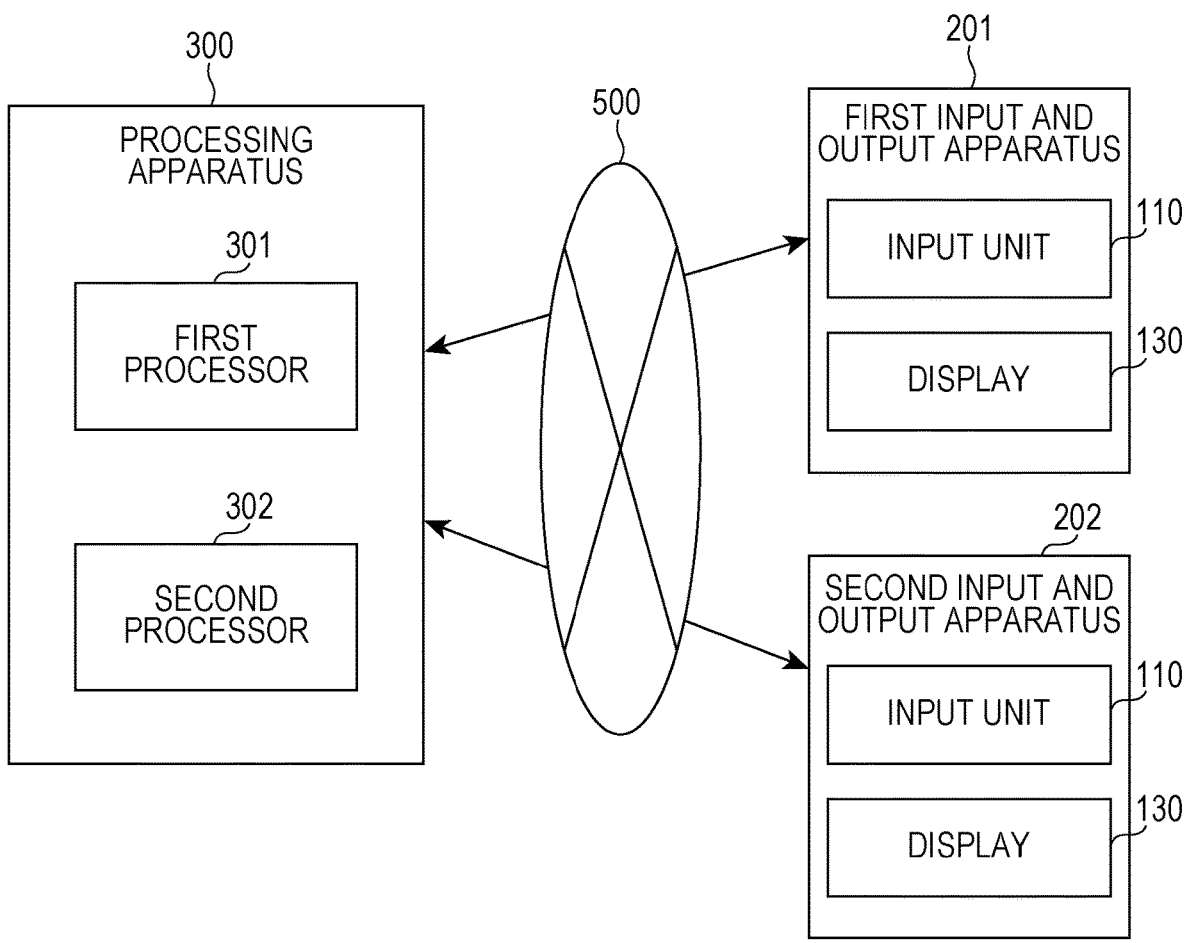
FIG. 15 is a block diagram illustrating a demand prediction system as a modification of the embodiment of the disclosure.

FIG. 15 is a block diagram illustrating a demand prediction system as a modification of the embodiment of the disclosure. The demand prediction system of FIG. 15 includes a first input and output apparatus 201, a second input and output apparatus 202, and a processing apparatus 300. The first input and output apparatus 201 includes the input unit 110 and the display 130. The second input and output apparatus 202 is identical in configuration to the first input and output apparatus 201, and includes an input unit 110 and a display 130.

The processing apparatus 300 is connected to each the first input and output apparatus 201 and the second input and output apparatus 202 for communication. The processing apparatus 300 includes a first processor 301 and a second processor 302. Each of the first processor 301 and the second processor 302 is identical in configuration to the processor 120 of FIG. 3.

If the error calculation unit 124 in the first processor 301 determines that the model error is an abnormal value, the information acquisition unit 123 in the first processor 301 acquires one or more explanatory variables from the second processor 302 as the hint information. The information acquisition unit 123 in the first processor 301 transmits to the second processor 302 request information requesting the second processor 302 to send the explanatory variable. Upon receiving the request information, the information acquisition unit 123 in the second processor 302 acquires the explanatory variable from the information storage unit 122, and then transmits the acquired explanatory variable to the first processor 301. The information acquisition unit 123 in the first processor 301 receives the hint information from the second processor 302, and then outputs the hint information to the explanatory variable acquisition unit 125. The explanatory variable acquisition unit 125 outputs the acquired hint information to the display 130. The display 130 selectively displays the acquired hint information.

The hint information may include local area information related to the local area of the store on the day on which the model error determined to be the abnormal value has been generated. The local area information related to the local area is information concerning an area within a predetermined distance from the store.

If the model error determined to be the abnormal value is generated, the explanatory variable acquisition unit 125 may acquire the location information of the store, and may acquire, as the hint information, weather information in the local area in accordance with the day on which the model error has been generated.

The explanatory variable acquisition unit 125 may acquire the location information of the store, and may acquire, as the hint information, information concerning an event that is being conducted at an event venue in the local area of the store on the day on which the model error determined to be the abnormal value has been generated, in accordance with the acquired location information of the store. The local area of the store refers to an area within a predetermined distance from the store.

1.6 Process of Prediction Model Correction Unit

The process of the prediction model correction unit 128 is described with reference to FIG. 16.

Figure 16:
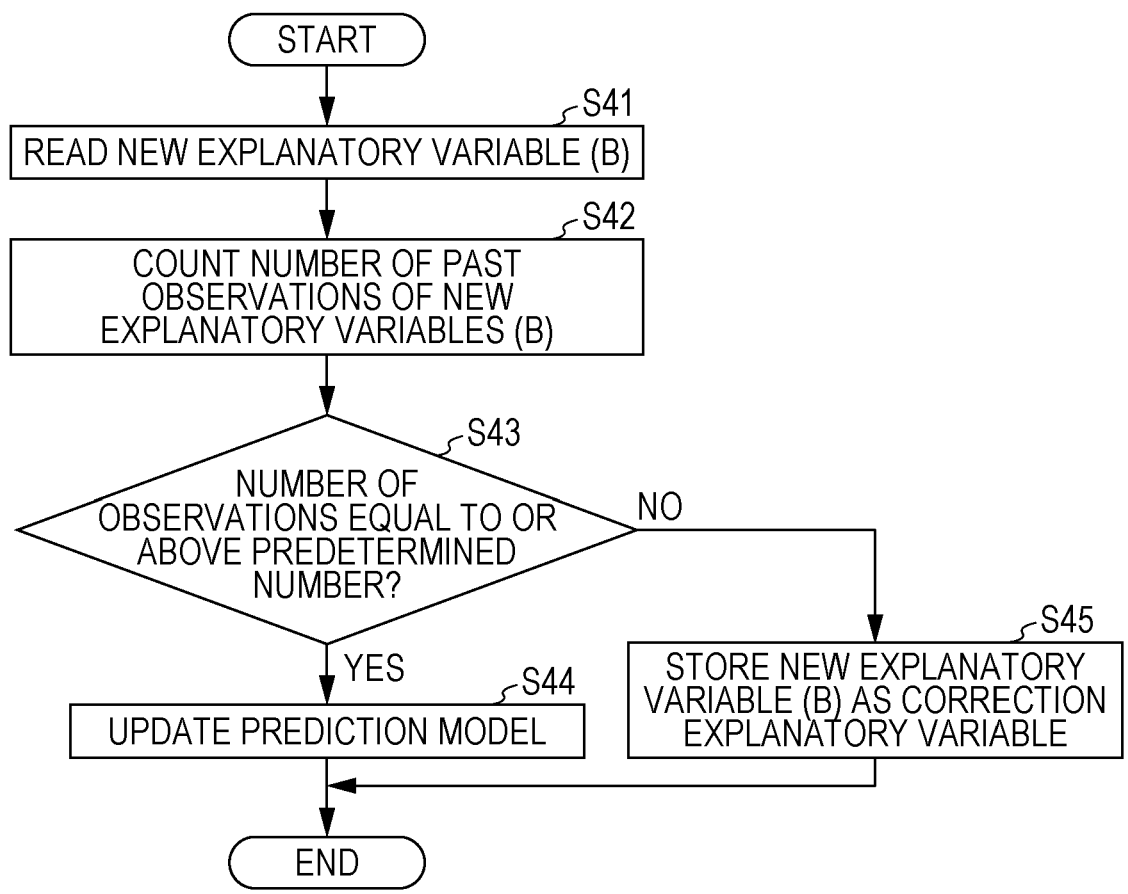
FIG. 16 is a flowchart illustrating a process performed by a prediction model correction unit of the embodiment of the disclosure.

FIG. 16 is a flowchart illustrating a process performed by the prediction model correction unit 128 of the embodiment of the disclosure.

The prediction model correction unit 128 acquires from the information storage unit 122 the new explanatory variable (B) added by the explanatory variable acquisition unit 125 (step S41).

The prediction model correction unit 128 counts the number of observations of the new explanatory variable (B) during a predetermined period of time (30 days, for example) (step S42). If the new explanatory variable (B) is information that may be observed very day (such as weather or temperature), the number of observations is 30. If the new explanatory variable (B) is information representing events conducted in the local area of the store (such athletic meetings at local primary schools or events in local amusement parks), the number of observations may possibly range from 1 to a few number.

The prediction model correction unit 128 determines whether the number of observations of the new explanatory variable (B) is equal to or above a predetermined count (step S43). The predetermined count may be a count fixed in advance, or may be dynamically changing value.

If the prediction model correction unit 128 determines that the number of observations is equal to or above the predetermined count (yes branch from step S43), the prediction model correction unit 128 updates the prediction model stored on the prediction model memory 121 (step S44). More specifically, the prediction model correction unit 128 learns the multiple regression model with the explanatory variable (A) and the new explanatory variable (B) being as explanatory variable candidates, and the number of visiting customers being a response variable. In accordance with the embodiment, the multiple regression model is a prediction model. As described above, the prediction model may be the neural network, the support vector machine, or the decision tree. When the prediction model is learned, the prediction model correction unit 128 may automatically select an explanatory variable to be used in the prediction model from the explanatory variable candidates using a technique called a step-wise method or a round-robin algorithm.

If the prediction model correction unit 128 determines that the number of observations is below the predetermined count (no branch from step S43), the prediction model correction unit 128 stores the new explanatory variable (B) as the correction explanatory variable on the information storage unit 122 (step S45). By storing as the correction explanatory variable the new explanatory variable (B) whose number of observations is below the predetermined count, the prediction model correction unit 128 corrects an increase or a decrease in the number of visiting customers caused by events having smaller numbers of occurrences (such as athletic meetings of a local primary schools) during a predetermined period of time.

FIG. 17 illustrates an example of an explanatory variable stored on the information storage unit 122 of the embodiment of the disclosure. The information storage unit 122 stores the variable name of a correction explanatory variable (a value taken by the correction explanatory variable), and a correction value of each variable in association with each other. The correction value of each variable may be defined as a function receiving a variable as an input, and then stored. The correction explanatory variable of FIG. 17 is a binary value serving as categorical data. As illustrated in FIG. 17, if the value of a variable is true, the event having the variable name occurs, and an affecting value (a correction value) to the number of visiting customers when the event occurs is stored. The correction value is calculated from a difference between the measurement value of the number of visiting customers and the prediction value of the prediction model on the day when the explanatory variable was true in the past.

The prediction model correction unit 128 performs an operation to update the prediction model using the new explanatory variable or an operation to store the new explanatory variable as the correction explanatory variable. The process thus ends.

The demand prediction method and the demand prediction apparatus of the embodiment efficiently use the user's experience and knowledge to achieve a higher-accuracy demand prediction. Also the demand prediction method and the demand prediction apparatus of the embodiment predict an increase or a decrease in the amount of the demand caused by a factor of a smaller number of observations during a predetermined period of time. The amount of the demand is predicted with higher accuracy.

In the disclosure, part or whole of the units, apparatuses, members, or elements, or part or whole of the blocks illustrated in FIGS. 1 through 3, and FIGS. 14 through 15 may be implemented using one or more electronic circuits including a semiconductor device, a semiconductor integrated circuit (IC), and large scale integration (LSI). The LSI and the IC may be integrated into a single chip, or a combination of multiple chips. For example, functional blocks other than a memory may be integrated into a single chip. The abbreviations LSI and IC are used to describe electronic circuits. The above-described elements may be implemented using a system LSI, very large scale integration (VLSI), or ultra-large integration (ULSI), differently referred to depending on the scale of integration. Also equally used is a field programmable gate array (FPGA) that is programmable after the manufacture of the LSI or a reconfigurable logic device that allows an internal connection thereof to be reconfigured inside the LSI or a circuit section thereof to be set up.

The function or operation of part or whole of the units, apparatuses, members, or elements may be implemented using a software program. In such a case, the software program may be recorded on a non-transitory computer readable recording medium, such as one or more read-only memories (ROMs), optical disks, or hard disks. When the software program is executed by a processing apparatus (processor), the function identified by the software program is executed by the processing apparatus (processor) and a peripheral device. The system or the apparatus may include one or more non-transitory recording media having store the software program, a processing apparatus (processor), and a hardware device, such as an interface.

The demand prediction method, the demand prediction apparatus, and the non-transitory computer-readable recording medium storing the demand prediction program, related to the disclosure, reduce the number of user input operations, reduce the time to acquire the explanatory variable, and increase the prediction accuracy of the amount of the demand. The demand prediction method, the demand prediction apparatus, and the non-transitory computer-readable recording medium find applications in predicting an amount of a future demand.

What is claimed is:

1. A demand prediction method using a computer, the method comprising:
    calculating, using a processor of the computer, an error between a prediction value of an amount of a past demand and a measurement value of the amount of the past demand, the prediction value of the amount of the past demand being calculated by inputting a measurement value of a past explanatory variable to a prediction model that is constructed in accordance with a measurement value of an amount of a demand at a predetermined location and an explanatory variable that serves as an external factor that affects an increase or a decrease in the amount of the demand at the predetermined location, the past explanatory variable being stored in a memory;
    determining, using the processor, whether the calculated error using the past explanatory variable is an abnormal value based on a comparison with a first reference threshold, wherein the calculated error is determined to be the abnormal value when the calculated error is at or above the first reference threshold, and the calculated error is determined to be a normal value when the calculated error is determined to be lower than the first reference threshold;
    in response to determining that the calculated error is the normal value, performing calculation with the prediction model without updating the prediction model;
    in response to determining that the calculated error is the abnormal value, determining that the past explanatory variable is insufficient and acquiring, using the processor and from an external source and not from the memory storing the past explanatory variable, a new explanatory variable stored in the external source different from where the past explanatory variable is stored;
    determining a number of past observations of the new explanatory variable;
    determining, using the processor, whether the prediction model is to be updated or not based on the number of past observations of the new explanatory variable that causes the error having the abnormal value;
    updating, using the processor, the prediction model in accordance with the acquired new explanatory variable when the number of past observations of the new explanatory variable that causes the error having the abnormal value is at or above a second [[the]] reference threshold,. wherein the updating of the prediction model includes modifying the prediction model to include the new explanatory variable acquired from the external source to provide a modified prediction model; and
    appending information of the new explanatory variable to the prediction model without updating the prediction model when the number of past observations of the new explanatory variable that causes the error having the abnormal value is below the second reference threshold.

2. The demand prediction method according to claim 1, further comprising time-sequentially displaying, using a display, the error when it is determined that the error is the abnormal value.

3. The demand prediction method according to claim 2, wherein the new explanatory variable is acquired by receiving an input from a user.

4. The demand prediction method according to claim 2, further comprising:
    acquiring, using the processor, candidate information indicating at least one explanatory variable candidate when it is determined that the error is the abnormal value; and
    selectively displaying, using the display, the acquired candidate information.

5. The demand prediction method according to claim 4, wherein the candidate information comprises local area information concerning a local area surrounding the predetermined location in a time period when a measurement operation is performed to obtain the measurement value of the past demand that is used to calculate the error.

6. The demand prediction method according to claim 4,
wherein keywords as the candidate information are acquired from an external server that provides a search engine or a social networking service in the acquiring of the candidate information when it is determined that the error is the abnormal value,
wherein the keywords as the candidate information are a plurality of keywords which a plurality of users used in a search using the search engine and which are extracted from the search engine in an order of a decreasing count used in the search from a larger count to a smaller count, or a plurality of keywords which a plurality of users posted with the social networking service and which are extracted from the social networking service in an order of a decreasing count posted with the social networking service from a larger count to a smaller count in the social networking service, and
wherein, the keywords acquired as the candidate information are displayed selectively in the displaying of the acquired candidate information.

7. The demand prediction method according to claim 4,
wherein at least one explanatory variable is acquired from another computer connected via a network, in the acquiring of the candidate information, when it is determined that the error is determined to be the abnormal value.

8. The demand prediction method according to claim 1,
wherein the acquired new explanatory variable satisfies a predetermined condition; and
wherein, in the updating, the prediction model is updated by correcting the calculated prediction value of the demand using the new explanatory variable.

9. The demand prediction method according to claim 8, further comprising:
calculating, using the processor, an affecting value on the increase or the decrease in the amount of the demand on a per correction explanatory variable basis; and
correcting, using the processor, the prediction value in response to the calculated affecting value.

10. The demand prediction method according to claim 8,
wherein, it is determined that the new explanatory variable satisfies the predetermined condition when the changes in the measurement value of the new explanatory variable within the predetermined period of time are equal to or larger in number than a predetermined count, and
wherein, in the updating, the prediction model is updated by correcting the calculated prediction value of the demand using the new explanatory variable when it is determined that the new explanatory variable satisfies the predetermined condition.

11. The demand prediction method according to claim 1, wherein it is determined that the error is the abnormal value when an absolute value of the error is at or above the reference threshold value.

12. The demand prediction method according to claim 1,
determining, using the processor, that the acquired new explanatory variable does not satisfy a predetermined condition; and
storing, using the processor, the new explanatory variable as a correction explanatory variable into the memory of the computer, when it is determined that the new explanatory variable does not satisfy the predetermined condition.

13. The demand prediction method according to claim 12,
wherein, it is determined that the new explanatory variable does not satisfy the predetermined condition when changes in the measurement value of the new explanatory variable within a predetermined period of time are smaller in number than a predetermined count.

14. The demand prediction method according to claim 1, wherein the new explanatory variable is associated with a certain corrective value with respect to the calculated error when the prediction model is to be updated.

15. A demand prediction apparatus, comprising:
a processor; and
a memory that stores a program,
wherein the program causes the processor to execute:
calculating an error between a prediction value of an amount of a past demand and a measurement value of the amount of the past demand, the prediction value of the amount of the past demand being calculated by inputting a measurement value of a past explanatory variable to a prediction model that is constructed in accordance with a measurement value of an amount of a demand at a predetermined location and an explanatory variable that serves as an external factor that affects an increase or a decrease in the amount of the demand at the predetermined location, the past explanatory variable being stored in the memory;
determining whether the error calculated using the past explanatory variable and by the explanatory variable calculator is an abnormal value based on a comparison with a first reference threshold, wherein the calculated error is determined to be the abnormal value when the calculated error is at or above the first reference threshold, and the calculated error is determined to be a normal value when the calculated error is determined to be lower than the first reference threshold;
in response to determining that the calculated error is the normal value, performing calculation with the prediction model without updating the prediction model;
in response to determining that the calculated error is the abnormal value, determining that the past explanatory variable is insufficient and acquiring, from an external source and not from the memory storing the past explanatory variable, a new explanatory variable stored in the external source different from where the past explanatory variable is stored;
determining a number of past observations of the new explanatory variable;
determining whether the prediction model is to be updated or not based on the number of past observations of the new explanatory variable that causes the error having the abnormal value;
updating the prediction model in accordance with the acquired new explanatory variable when the number of past observations of the new explanatory variable that causes the error having the abnormal value is at or above a second reference threshold, wherein the updating of the prediction model includes modifying the prediction model to include the new explanatory variable acquired from the external source to provide a modified prediction model; and
appending information of the new explanatory variable to the prediction model without updating the prediction model when the number of past observations of the new explanatory variable that causes the error having the abnormal value is below the second reference threshold.

16. A non-transitory computer-readable recording medium storing a program causing a computer to execute:
   calculating an error between a prediction value of an amount of a past demand and a measurement value of the amount of the past demand, the prediction value of the amount of the past demand being calculated by inputting a measurement value of a past explanatory variable to a prediction model that is constructed in accordance with a measurement value of an amount of a demand at a predetermined location and an explanatory variable that serves as an external factor that affects an increase or a decrease in the amount of the demand at the predetermined location, the past explanatory variable being stored in a memory;
   determining whether the calculated error using the past explanatory variable is an abnormal value based on a comparison with a first reference threshold, wherein the calculated error is determined to be the abnormal value when the calculated error is at or above the first reference threshold, and the calculated error is determined to be a normal value when the calculated error is determined to be lower than the first reference threshold;
   in response to determining that the calculated error is the normal value, performing calculation with the prediction model without updating the prediction model;
   in response to determining that the calculated error is the abnormal value, determining that the past explanatory variable is insufficient and acquiring, from an external source and not from the memory storing the past explanatory variable, a new explanatory variable stored in the external source different from where the past explanatory variable is stored;
   determining a number of past observations of the new explanatory variable;
   determining whether the prediction model is to be updated or not based on the number of past observations of the new explanatory variable that causes the error having the abnormal value;
   updating the prediction model in accordance with the acquired new explanatory variable when the number of past observations of the new explanatory variable that causes the error having the abnormal value is at or above a second reference threshold, wherein the updating of the prediction model includes modifying the prediction model to include the new explanatory variable acquired from the external source to provide a modified prediction model; and
   appending information of the new explanatory variable to the prediction model without updating the prediction model when the number of past observations of the new explanatory variable that causes the error having the abnormal value is below the second reference threshold.

* * * * *